(12) United States Patent
Yanagawa et al.

(10) Patent No.: US 12,475,664 B2
(45) Date of Patent: Nov. 18, 2025

(54) IMAGE PROCESSING DEVICE, MANIPULATOR SYSTEM, IMAGE PROCESSING METHOD AND DISPLAY METHOD

(71) Applicant: OLYMPUS MEDICAL SYSTEMS CORP., Tokyo (JP)

(72) Inventors: Ryota Yanagawa, Hachioji (JP); Kosuke Kishi, Mitaka (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 69 days.

(21) Appl. No.: 18/385,552

(22) Filed: Oct. 31, 2023

(65) Prior Publication Data
US 2024/0062499 A1  Feb. 22, 2024

Related U.S. Application Data

(63) Continuation of application No. PCT/JP2021/023516, filed on Jun. 22, 2021.

(51) Int. Cl.
  *G06T 19/20* (2011.01)
  *A61B 1/00* (2006.01)
  *G06T 15/10* (2011.01)

(52) U.S. Cl.
  CPC .......... *G06T 19/20* (2013.01); *A61B 1/00009* (2013.01); *A61B 1/0005* (2013.01); *G06T 15/10* (2013.01); *G06T 2219/2016* (2013.01)

(58) Field of Classification Search
  CPC . G06T 19/20; G06T 2219/2016; G06T 19/00; G06T 15/10; A61B 34/25; A61B 2034/102; A61B 1/0005; A61B 2090/367; A61B 1/00009; A61B 1/00194; A61B 1/009; B25J 18/06
  See application file for complete search history.

(56) References Cited

U.S. PATENT DOCUMENTS

| | | |
|---|---|---|
| 2006/0170765 A1 | 8/2006 | Akimoto et al. |
| 2011/0234780 A1* | 9/2011 | Ito .............................. A61B 1/05 348/E7.085 |
| 2017/0084027 A1 | 3/2017 | Mintz et al. |

(Continued)

FOREIGN PATENT DOCUMENTS

| | | |
|---|---|---|
| JP | 2004-180940 A | 7/2004 |
| JP | 2009-056238 A | 3/2009 |

(Continued)

OTHER PUBLICATIONS

Japanese Office Action dated Oct. 29, 2024 received in 2023-529259.

(Continued)

*Primary Examiner* — Muhammad N Edun
(74) *Attorney, Agent, or Firm* — Scully, Scott, Murphy & Presser, P.C.

(57) ABSTRACT

An image processing device includes a processor. The processor acquires shape information about a variable shape of a manipulator. The processor displays on a display a CG image of a manipulator model as viewed from a virtual camera in an object space, based on the shape information. The processor executes a rotation process of rotating a viewing direction of the virtual camera by a rotation angle according to the shape information.

20 Claims, 17 Drawing Sheets

(56) References Cited

U.S. PATENT DOCUMENTS

| | | | |
|---|---|---|---|
| 2017/0337683 A1 | 11/2017 | Yoshida et al. | |
| 2021/0290310 A1* | 9/2021 | Laby | A61B 34/32 |
| 2022/0198742 A1 | 6/2022 | Nishide et al. | |
| 2023/0098497 A1* | 3/2023 | Laby | A61B 90/361 |
| | | | 606/130 |
| 2023/0281841 A1* | 9/2023 | Soper | A61B 34/35 |
| | | | 382/128 |

FOREIGN PATENT DOCUMENTS

| | | |
|---|---|---|
| JP | 2017-529882 A | 10/2017 |
| JP | 2017205292 A | 11/2017 |
| JP | 2018532467 A | 11/2018 |
| WO | 2005/039401 A1 | 5/2005 |
| WO | 2016/004000 A1 | 1/2016 |
| WO | 2021/054360 A1 | 3/2021 |

OTHER PUBLICATIONS

International Search Report dated Sep. 14, 2021 received in PCT/JP2021/023516.

* cited by examiner

FIG.1
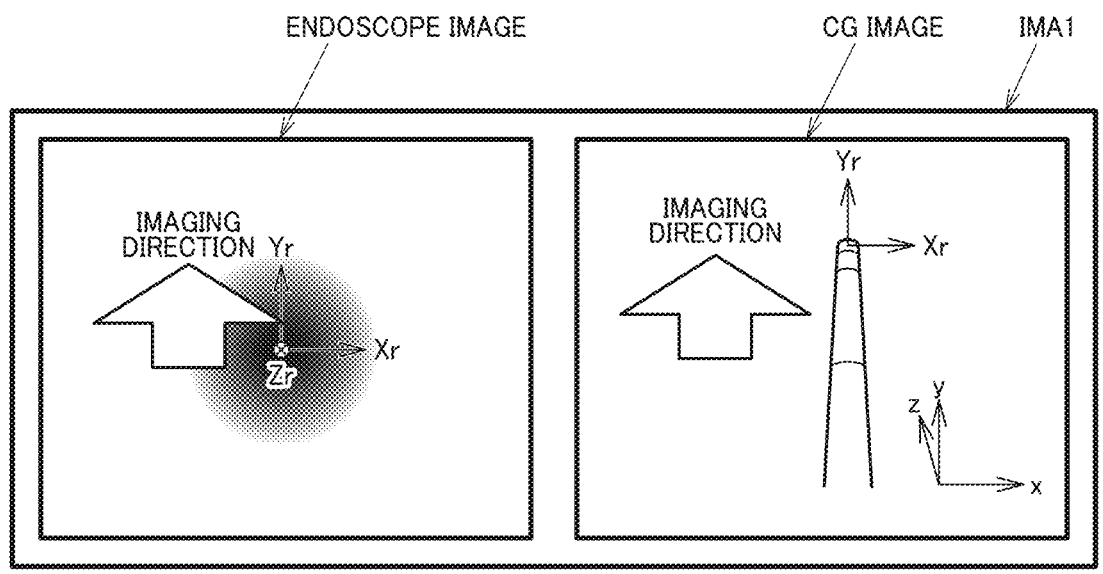
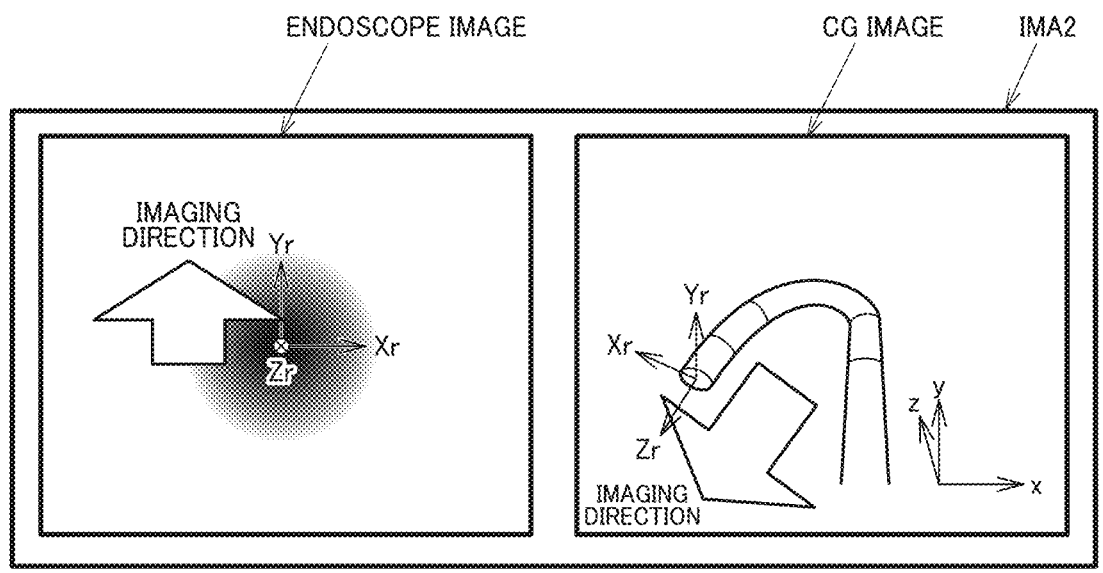

FIG.6
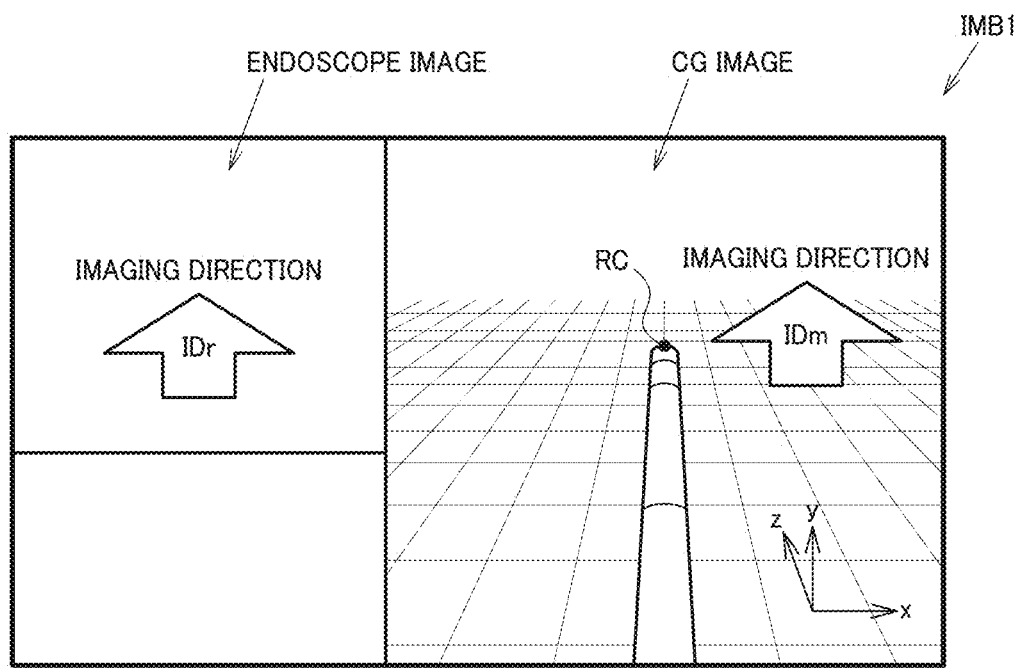
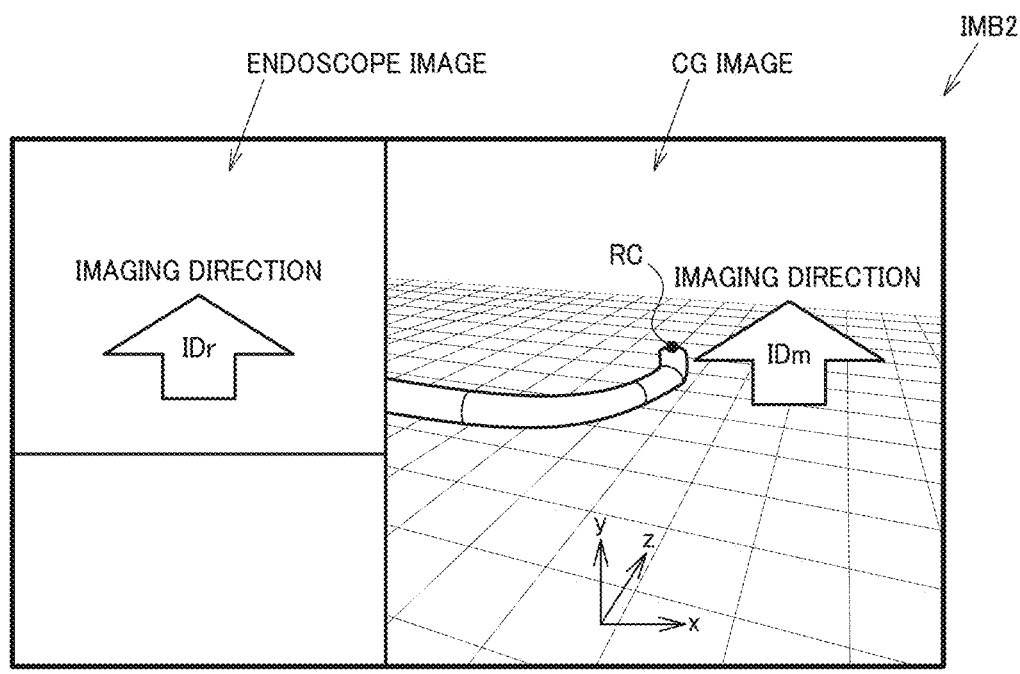

FIG.9
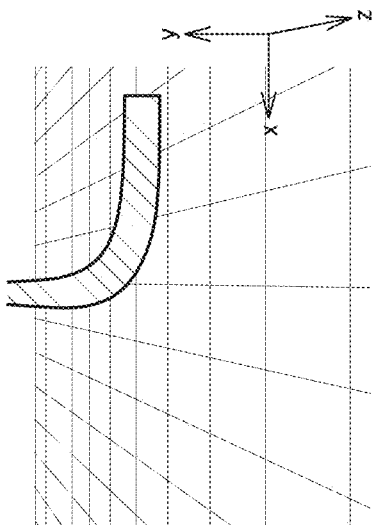
$105° \leq \theta m \leq 180°$
$\theta c = 180°$
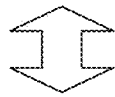
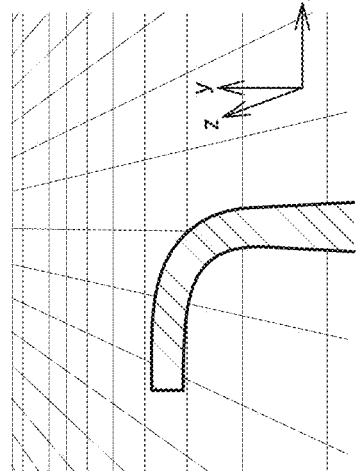
$0° \leq \theta m \leq 75°$
$\theta c = 0°$

IMAGE PROCESSING DEVICE, MANIPULATOR SYSTEM, IMAGE PROCESSING METHOD AND DISPLAY METHOD

CROSS REFERENCE TO RELATED APPLICATIONS

This application is a continuation of International Patent Application No. PCT/JP2021/023516, having an international filing date of Jun. 22, 2021, which designated the United States, the entirety of which is incorporated herein by reference.

BACKGROUND OF THE INVENTION

Japanese Unexamined Patent Application Publication (Translation of PCT Application) No. 2017-529882 discloses a navigation technique of displaying a virtual 3D model of a bending portion of an endoscope together with an endoscope image. In response to an angle operation on an operation section, a bending angle of the bending portion in the 3D model changes based on the operation input.

SUMMARY OF THE INVENTION

In accordance with one of some aspect, there is provided an image processing device comprising a processor,
the processor being configured to:
acquire shape information about a shape of a manipulator, the shape being variable; and
display on a display a computer graphics image of a manipulator model as viewed from a virtual camera in an object space, based on the shape information,
wherein
the processor is configured to execute a rotation process of rotating a viewing direction of the virtual camera by a rotation angle according to the shape information.
In accordance with one of some aspect, there is provided a manipulator system with an imaging section provided at a distal end thereof, comprising:
a processor; and
a display, wherein
the processor is configured to display on the display a computer graphics image of a manipulator model in a viewing direction of a virtual camera that follows an imaging direction of the imaging section.
In accordance with one of some aspect, there is provided an image processing method comprising:
acquiring shape information about a shape of a manipulator, the shape being variable;
executing a rotation process of rotating a viewing direction of a virtual camera in an object space by a rotation angle according to the shape information, based on the shape information; and
displaying on a display a computer graphics image of a manipulator model as viewed from the virtual camera in the object space.
In accordance with one of some aspect, there is provided a display method for displaying a computer graphics image of a manipulator model, comprising:
displaying on a display the computer graphics image of the manipulator model in a viewing direction of a virtual camera that follows an imaging direction of an imaging section provided at a distal end of a manipulator.

BRIEF DESCRIPTION OF THE DRAWINGS

FIG. 1 illustrates example displays of a 3D model displayed with a proximal end of a bending portion of an endoscope fixed.
FIG. 6 illustrates example displays according to the first embodiment.
FIG. 9 illustrates example CG image displays according to the second embodiment.

DETAILED DESCRIPTION

Figure 2:
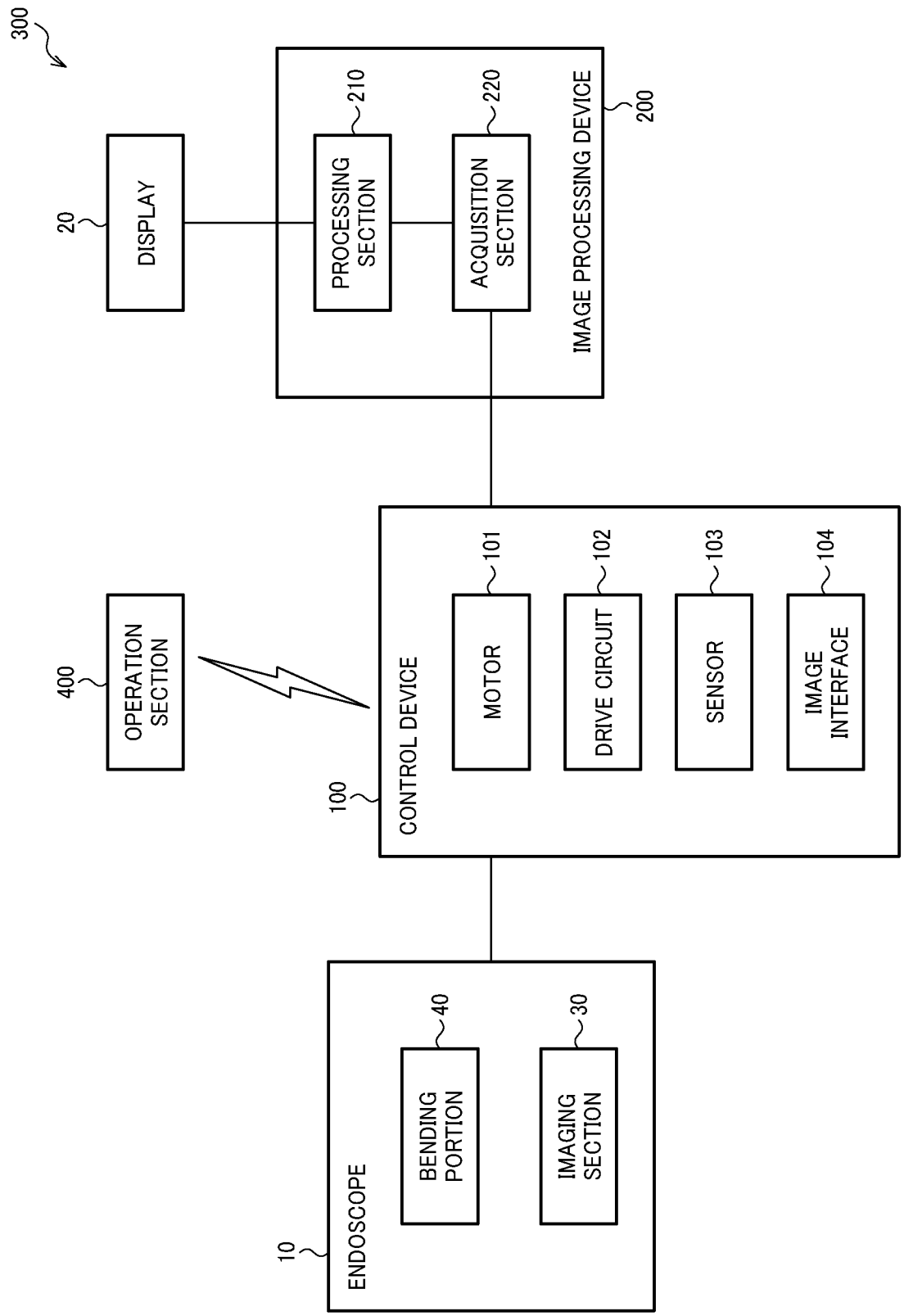
FIG. 2 illustrates example configurations of an image processing device and an endoscope system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

While the following paragraphs describe examples of displaying a 3D model of an endoscope in an endoscope system, the technique of the present embodiment is also applicable to displaying CG images of a manipulator model in a manipulator system. A manipulator model refers to a 3D model of a manipulator whose shape changes as it is operated. The manipulator is mounted with or holds an imaging section, and an imaging direction of the imaging section changes according to changes in the shape of the manipulator. CG images refer to images generated from the 3D model of the manipulator. While CG images are two-dimensional information, they are also called a 3D model or 3D images in the sense that they are images of a 3D model.

1. Image Processing Device and Endoscope System

FIG. 1 illustrates example displays of a 3D model displayed with a proximal end of a bending portion of an endoscope fixed. Suppose that an endoscope image is displayed on the left side of the screen while a CG image of the endoscope is displayed on the right side of the screen. Note that "CG" is an abbreviation for Computer Graphics.

In FIG. 1, the Xr, Yr, and Zr represent a coordinate system fixed to a distal end of the endoscope in the real space in which the actual endoscope resides, where Zr corresponds to the imaging direction. The x, y, and z represent a world coordinate system fixed in an object space in which a 3D model is constructed. In the object space, a proximal end of a bending portion is fixed to point in the z direction, with the imaging direction changing according to a bending angle.

The displayed image IMA1 shows an example where the bending portion is straight and not bent. In the endoscope image, the direction going into the screen always corresponds to the imaging direction. When the bending portion is straight, the imaging direction in the 3D model also corresponds to the direction going into the screen, so that the imaging direction in the endoscope image is aligned with the imaging direction in the 3D model. In this case, an intuitive bending operation is possible while viewing the 3D model. In other words, the direction in which one wants to bend the bending portion is intuitively aligned with the operation direction.

The displayed image IMA2 shows an example where the bending portion is making a J-turn to the left, i.e., the distal end of the endoscope is pointing in a direction out of the screen. In the 3D model, the imaging direction corresponds to the direction out of the screen, so that the imaging direction in the endoscope image is opposite the imaging direction in the 3D model. In this case, the direction in which one wants to bend the bending portion and the operation direction are less likely to be intuitively aligned, making it difficult to perform an intuitive bending operation while viewing the 3D model. For example, if one wants to bend the bending portion further, the distal end of the endoscope will be moved to the right in the 3D model, whereas the actual operation requires bending the bending portion to the left. As such, the moving direction of the distal end in the 3D model and the operation direction are not aligned.

For example, for endoscopes whose bending portion is bent by manually operating a dial, a surgeon can estimate a bending angle to some extent based on a haptic feedback obtained from the dial, such as resistance associated with wire pulling. However, for motorized endoscopes whose bending portion is driven electrically, the wire is pulled using a motor or other drive unit, making it difficult for the surgeon to obtain a haptic force feedback from an operation section held by the surgeon. Further, motorized endoscopes also allow for bending operations using an operation section separated from the driving unit, such as a touchpad or a remote controller, which makes it even more difficult to obtain a haptic feedback. Therefore, it is desirable to assist in the surgeon's understanding by providing a navigation that displays a 3D model of the bending state so that the surgeon can easily recognize the bending angle. One associated problem is that the operation direction of the touchpad or other tools as described above is less likely to be intuitively aligned with the movement of the 3D model.

FIG. 2 illustrates example configurations of an image processing device and an endoscope system according to the present embodiment. The endoscope system 300 includes an endoscope 10, a display 20, a control device 100, an image processing device 200, and an operation section 400. While a motorized endoscope is illustrated by way of example, the method described below is applicable not only to motorized endoscopes but also to various endoscopes having a bending portion. As mentioned earlier, in the present embodiment, the endoscope system 300 corresponds to a manipulator system, and the endoscope 10 corresponds to a manipulator.

The endoscope 10, also called a scope, is inserted into a body of a human to take images inside the body. In the present embodiment, a flexible scope is envisioned that includes a flexible insertion portion. The endoscope 10 includes a bending portion 40 and an imaging section 30. The bending portion 40 is provided at a distal end of the endoscope 10 and is configured to bend in response to a bending operation. The bending portion 40 is also called a bending device or bending mechanism. The imaging section 30, which is an imaging device including an image sensor, an objective lens, etc., is provided at a distal end of the bending portion 40. The imaging section 30 takes images inside the body and transmits corresponding image signals to the control device 100. The endoscope 10 may further include an illumination lens, forceps ports, or suction ports.

The control device 100 controls the endoscope 10 and drives its bending motion. The control device 100 is also called a controller, drive unit, or processor unit. The control device 100 includes a motor 101, a drive circuit 102, a sensor 103, and an image interface 104.

The drive circuit 102, which is a circuit to drive the motor 101, drives the motor 101 in response to operation input from the operation section 400. The motor 101 causes the bending portion 40 to bend by pulling wire connected to the bending portion 40 of the endoscope 10. The bending portion 40 thus bends at a bending angle according to the operation input. The sensor 103 detects the bending angle of the bending portion 40 and transmits a corresponding detection signal to the image processing device 200. The sensor 103 is, for example, a rotary encoder that detects an amount of rotation of the motor 101 or an optical sensor that detects an amount of wire travel. The sensor 103 transmits the detected bending angle to the image processing device 200.

The sensor 103 may detect a physical quantity from which the bending angle can be estimated, and need not detect the bending angle itself. While FIG. 2 illustrates the sensor as being provided in the control device 100, any configuration is possible so long as the bending angle of the bending portion 40 can be detected. For example, the bending angle may be obtained from operation input on the operation section 400 for bending operation. Alternatively, a UPD, or an endoscope shape observation device, may be used to externally observe the shape of the bending portion 40, and the bending angle may be obtained from the observed shape.

The operation section 400 receives operation input to operate the endoscope 10 and wirelessly transmits information about the operation input to the control device 100. The operation section 400 is capable of receiving at least bending operations. The operation section 400 is, for example, a touchpad, and recognizes a touch, swipe, or other operation on the touchpad as a bending operation. The operation section 400 may include buttons or dials for bending operations, and may communicate with the control device 100 by wire rather than wirelessly.

The image interface 104 receives an image signal from the imaging section 30 of the endoscope 10, executes image processing on the image signal to generate an endoscope image, and transmits the image data of the endoscope image to the image processing device 200. Image processing includes, for example, development processing, gradation correction processing, and white balance processing. In an alternative configuration, the image interface 104 may transfer the image signal to the image processing device 200, and the image processing device 200 may construct the endoscope image from the image signal.

The image processing device 200 generates a 3D model of the endoscope 10 based on the bending angle detected by the sensor 103, and displays a corresponding CG image and the endoscope image on the display 20. For example, the image processing device 200 is an information processing device such as a PC or server. The image processing device 200 includes an acquisition section 220 and a processing section 210. Various types of hardware are contemplated for the acquisition section 220, such as, for example, a communication interface provided in the information processing device, or a data interface provided in hardware constituting the processing section 210. The processing section 210 is also called a processor, processing device, processing circuit, etc. Various types of hardware are contemplated for the processing section 210, such as, for example, a CPU, GPU, microcomputer, etc., or an ASIC, FPGA, etc., or a combination thereof. The image processing device 200 may include a memory (not shown), where the memory may store a program describing processes to be executed by the processing section 210, and the program may be executed by the processing section 210 to implement the processes to be executed by the processing section 210. While FIG. 2 illustrates the image processing device 200 as being external to the control device 100, the image processing device 200 may be embedded in the control device 100.

The acquisition section 220 receives the image data of the endoscope image and the information about the bending angle from the control device 100. The processing section 210 generates a 3D model of the endoscope 10 in an object space and displays on the display 20 a CG image of the endoscope 10, generated based on the 3D model, and the endoscope image. The endoscope image is displayed in a first display area of the display 20, while the CG image is displayed in a second display area of the display 20. Alternatively, a first display and a second display may be provided, with the endoscope image displayed on the first display and the CG image displayed on the second display. The processing section 210 bends the bending portion of the 3D model at the bending angle detected by the sensor 103. Upon viewing the CG image, the surgeon can recognize the shape of the distal end of the endoscope inserted into the body.

Figure 3:
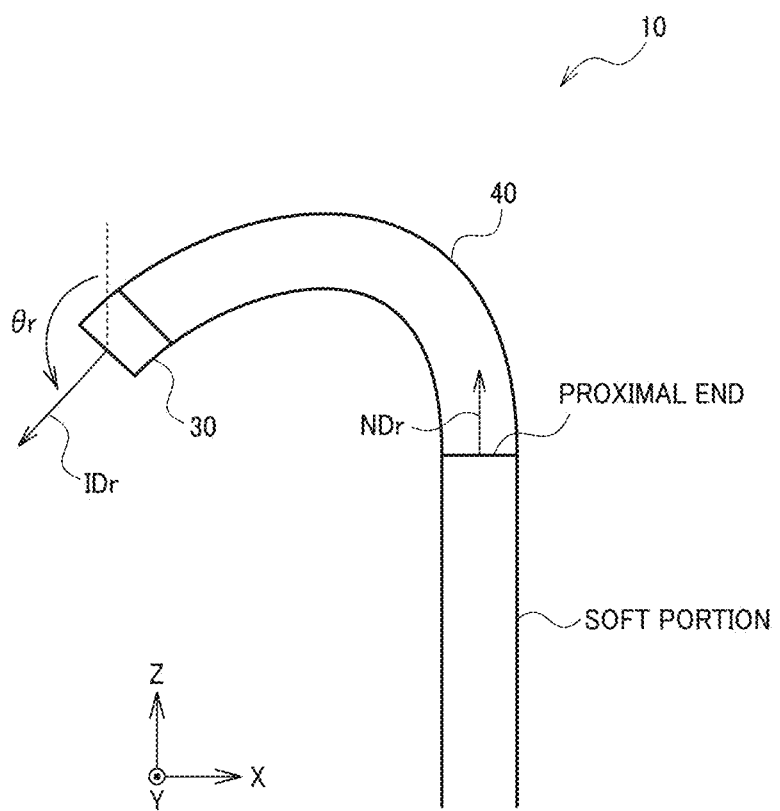
FIG. 3 illustrates an endoscope in real space.

A method for constructing the 3D model and CG image will now be described. Referring to FIG. 3, the endoscope 10 in real space will first be described.

The base of the soft portion, though not shown in FIG. 3, is connected to the control device 100. The proximal end of the bending portion 40 is connected to the distal end of the soft portion, and a rigid portion is provided at a distal end of the bending portion 40. The rigid portion accommodates the imaging section 30. The bending portion 40 has a number of joints connected in series and can bend in up-down and right-left directions. The bending portion 40 has an elongate cylindrical shape in its unbent state, and the bending refers to curving of the cylinder axis in an up, down, left or right fashion. Suppose that the XYZ coordinates are fixed at the distal end of the soft portion, i.e., the proximal end of the bending portion 40, where the Z axis is parallel to an axial direction NDr of the distal end of the soft portion. In this case, the bending in the up-down direction occurs about the X axis, while the bending in the right-left direction occurs about the Y axis. With the axial direction of the distal end of the bending portion 40, i.e., the imaging direction, defined as IDr, an angle between the axial direction NDr of the distal end of the soft portion and the imaging direction IDr is a bending angle $\theta r$.

FIG. 3 shows the bending angle about the Y axis, i.e., in the right-left direction. However, since the bending portion 40 is operated independently in the up-down and right-left directions, there are bending angles about the X axis and about the Y axis. The following descriptions that refer to the bending angle as $\theta r$ is applicable to both bending operations about the X axis and about the Y axis. When the distinction is necessary for the purpose of description, the bending angles about the X axis and about the Y axis are denoted as $\theta x$ and $\theta y$, respectively.

Figure 4:
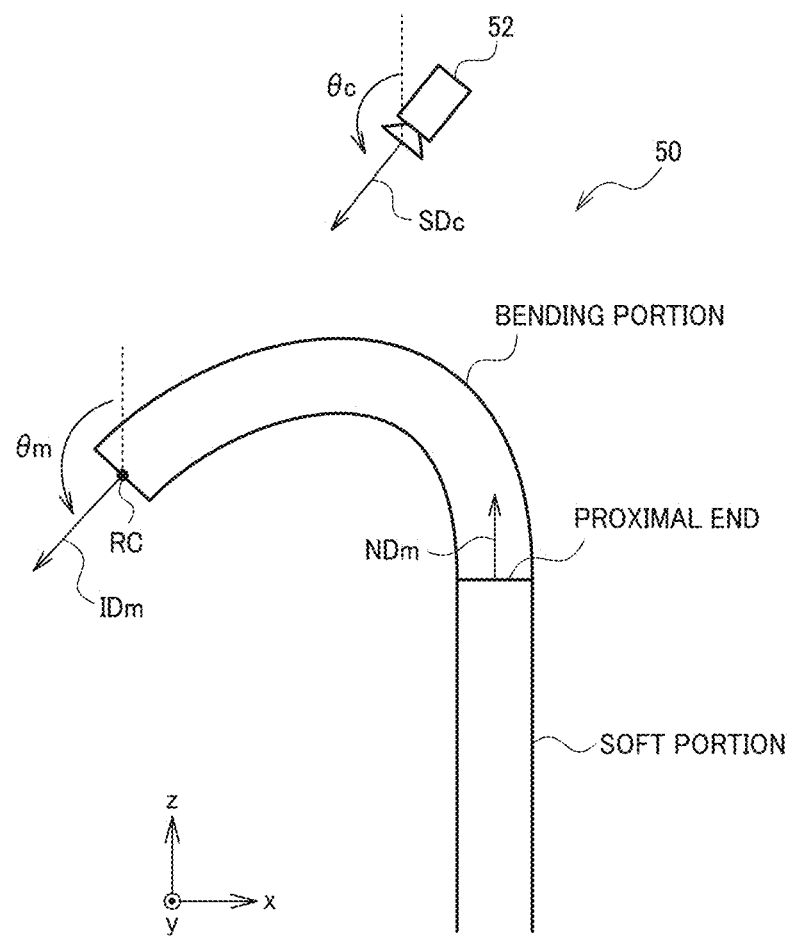
FIG. 4 illustrates a 3D model constructed by a processing section.

FIG. 4 illustrates the 3D model constructed by the processing section 210. Suppose that the xyz coordinates are fixed in the object space where a 3D model 50 is constructed. The xyz coordinates are also called world coordinates. With the axial direction of the distal end of the soft portion defined as NDm, the 3D model 50 of the endoscope is fixed in the object space such that the direction NDm is parallel to the z direction. The fixing position is, for example, the base of the soft portion or the proximal end of the bending portion. With the axial direction of the distal end of the bending portion, i.e., the imaging direction, defined as IDm, an angle between the axial direction NDm of the distal end of the soft portion and the imaging direction IDm is a bending angle $\theta m$. The 3D model 50 is, for example, a model constructed with primitive planes such as polygons, or a wireframe model.

The sensor 103 detects the bending angle $\theta r$ of the endoscope 10 in real space, and the processing section 210 constructs the 3D model 50 using that bending angle $\theta r$ as the bending angle $\theta m$ in the 3D model 50. The processing section 210 sets a viewing direction SDc of a virtual camera 52 based on the bending angle $\theta m$, and sets a position and orientation of the virtual camera 52 such that the viewing direction SDc points at a gaze point RC. For example, the gaze point RC is set at the distal end of the bending portion, but this is not limiting and the gaze point RC may be set at any point within the bending portion, such as near the distal end of the bending portion. The processing section 210 places the virtual camera 52 such that it looks down on the gaze point RC from slightly above (in +y direction relative to) the 3D model 50.

The processing section 210 changes the viewing direction SDc by changing the position and orientation of the virtual camera 52 according to the bending angle $\theta m$. The viewing direction SDc of the virtual camera 52 will be rotated around the gaze point RC. Specifically, in the case of bending about the y axis, the viewing direction SDc rotates around a rotation axis that passes through the gaze point RC and is parallel to the y axis. The gaze point RC is hereinafter also referred to as the center of rotation of the viewing direction SDc. The position and orientation of the virtual camera 52 are also referred to as a viewpoint, and changing the position and orientation of the virtual camera 52 according to the bending angle $\theta m$ is also expressed as "rotating the viewpoint".

An angle between a viewing direction SDc of the virtual camera 52 and the axial direction NDm of the distal end of the soft portion is defined as an angle $\theta c$. The viewing direction SDc is represented by this angle $\theta c$. In the case of bending about the y axis, an angle between the viewing direction SDc and the axial direction NDm in the z-x plane is the angle θc. That is, the rotation angle of the viewing direction SDc about the y axis is the angle θc. In the case of bending about the x axis, the rotation angle of the viewing direction SDc about the x axis is the angle θc.

The processing section 210 controls the rotation angle of the viewing direction SDc about the x axis according to the bending angle θx about the x axis, and controls the rotation angle of the viewing direction SDc about the y axis according to the bending angle θy about the y axis. The following descriptions that refer to the angle θc is applicable to both viewpoint rotations about the x axis and about the y axis. When the distinction is necessary for the purpose of description, the rotation angles about the x axis and about the y axis are denoted as θcx and θcy, respectively.

The processing section 210 generates a CG image of the endoscope 3D model as viewed from the virtual camera 52 and displays the CG image on the display 20 together with the endoscope image. This allows the viewpoint of the virtual camera 52 to change according to the bending angle of the bending portion 40, so that the imaging direction in the endoscope image and the imaging direction in the 3D model can be substantially aligned on the screen. Such substantial alignment of the imaging directions helps the surgeon recognize the direction of the bending operation. As will be described below in the first to sixth embodiments, the imaging direction in the endoscope image and the imaging direction in the 3D model do not necessarily need to be aligned, but may only need to be similar enough to allow the surgeon to intuitively recognize the direction of the bending operation. The processing section 210 may display a CG image of an in-vivo 3D model together with the CG image of the endoscope image. For example, the in-vivo 3D model is constructed based on tomographic images previously taken by CT, MRI, or the like, and constructed in the object space together with the endoscope 3D model.

In the above embodiment, the image processing device 200 includes the acquisition section 220 and the processing section 210. The acquisition section 220 acquires shape information about a variable shape of the manipulator. Based on the shape information, the processing section 210 displays on the display 20 a CG image of the manipulator model as viewed from the virtual camera 52 in the object space. The processing section 210 executes a rotation process of rotating the viewing direction SDc of the virtual camera 52 by a rotation angle θc according to the shape.

According to the present embodiment, the imaging direction of the imaging section mounted on or held by the manipulator changes according to the shape of the manipulator. As the viewpoint of the virtual camera 52 also changes according to the shape of the manipulator, the imaging direction in the captured image and the imaging direction in the CG image of the manipulator model can be substantially aligned on the screen.

In the present embodiment, the manipulator includes the bending portion 40. The acquisition section 220 acquires information about a bending angle θr of the bending portion 40 as the shape information. The processing section 210 executes a rotation process of rotating the viewing direction SDc of the virtual camera 52 by a rotation angle θc according to the bending angle θr.

According to the present embodiment, the imaging direction IDr of the imaging section 30 mounted at the distal end of the bending portion 40 changes according to the bending angle θr. As the viewpoint of the virtual camera 52 also changes according to the bending angle θr, the imaging direction IDr in the endoscope image and the imaging direction IDm in the CG image of the endoscope 3D model can be substantially aligned on the screen. This helps the surgeon intuitively recognize the direction of the bending operation upon viewing the 3D model.

In the present embodiment, the rotation process is a process of rotating the viewing direction SDc of the virtual camera 52 around a set point on the manipulator model. More specifically, for rotation about the x axis, the rotation process is a process of rotating the viewing direction SDc around a rotation axis that passes through the set point and is parallel to the x axis, and for rotation about the y axis, the rotation process is a process of rotating the viewing direction SDc around a rotation axis that passes through the set point and is parallel to the y axis.

In the present embodiment, the gaze point RC corresponds to the set point. As mentioned earlier, the gaze point RC may be set within the bending portion of the 3D model. In other words, the set point is not limited to the distal end of the manipulator model, but may be any point on the manipulator model. For example, the set point may be at any position within a portion whose shape changes by manipulation, or at the proximal end or any other portion where the shape-changing portion connects to a portion whose shape never changes.

In the present embodiment, the manipulator system includes: the manipulator provided at its distal end with the imaging section; the image processing device 200; and the display 20. The image processing device 200 displays on the display 20 a CG image of the manipulator model in the viewing direction SDc of the virtual camera 52 that follows the imaging direction IDr of the imaging section.

According to the present embodiment, the viewing direction SDc of the virtual camera 52 follows the imaging direction IDr. This causes the CC image of the manipulator model to be displayed such that the imaging in the CG image of the manipulator model is substantially aligned with the imaging direction in the captured image. Note that the phrase "the viewing direction follows the image direction" means that the viewing direction changes in the same direction as any change in the imaging direction, and thus the viewing direction does not necessarily need to be aligned with the imaging direction. For example, in the second and third embodiments described below, the viewing direction is not necessarily aligned with the imaging direction, but such cases are also included in what is meant by the term "following".

2. First Embodiment

Figure 5:
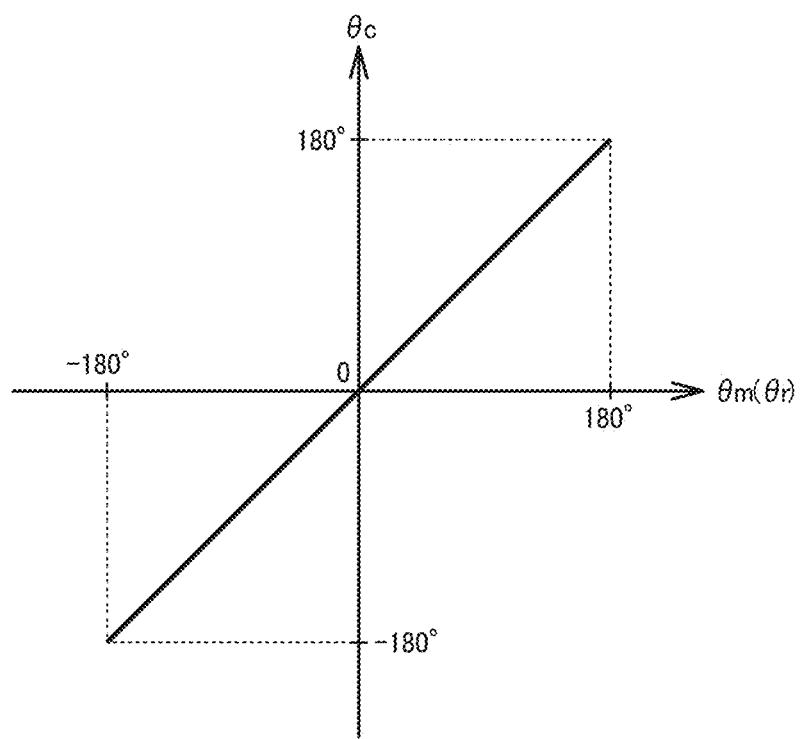
FIG. 5 illustrates relationship between a bending angle and a rotation angle of a viewing direction according to a first embodiment.

FIG. 5 illustrates relationship between the bending angle θm and the rotation angle θc of the viewing direction SDc according to the first embodiment. FIG. 6 illustrates example displays according to the first embodiment. In the following description, for angles about the y axis, counterclockwise angles as seen from the +y direction are defined to be positive, and for angles about the x axis, counterclockwise angles as seen from the +x direction are defined to be positive. In the context of bending, leftward bending and upward bending are the positive angle bending. However, the definition of the angles is not limited to this.

As shown in FIG. 5, the processing section 210 sets θc=θm for the entire range of −180 degrees≤θm≤180 degrees. That is, the processing section 210 aligns the viewing direction SDc of the virtual camera 52 with the bending angle θm of the endoscope 3D model 50. This causes the imaging direction IDm in the CG image to always point in the direction going into the screen, as shown in FIG.

6, so that the imaging direction IDm is always aligned with the imaging direction IDr in the endoscope image. The displayed image IMB1 is an example display where the bending portion 40 is not bent, and the displayed image IMB2 is an example display where the bending portion 40 is making a J-turn to the left. With the viewing direction SDc of the virtual camera 52 oriented in alignment with the imaging direction IDm, the imaging direction IDm in the CG image corresponds to the direction going in to the screen.

Figure 7:
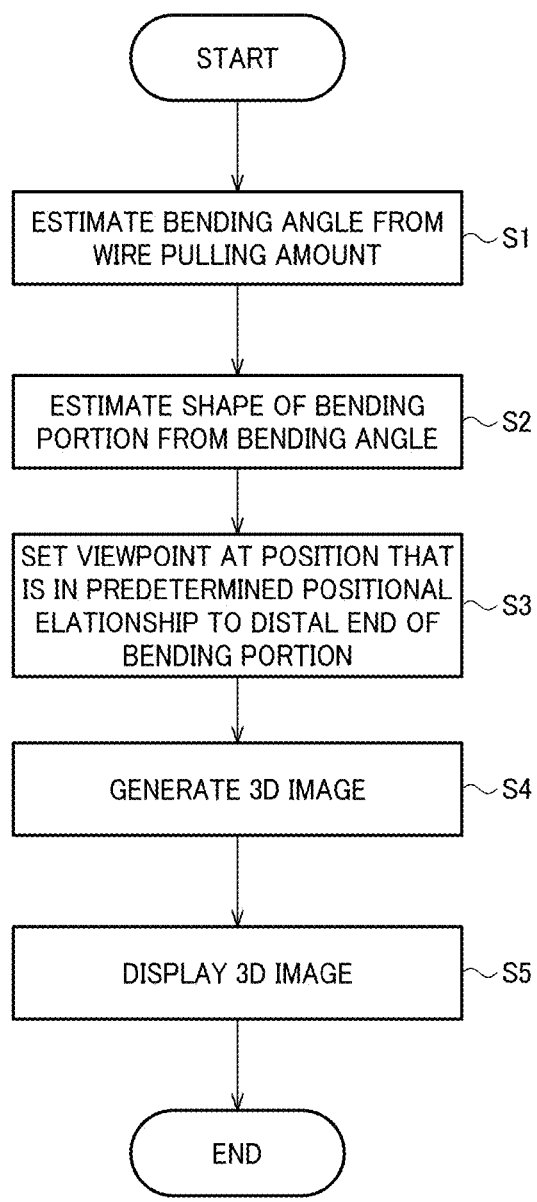
FIG. 7 is a process flowchart according to the first embodiment.

FIG. 7 is a process flowchart according to the first embodiment. In step S1, the processing section 210 estimates the bending angle θr of the endoscope 10 from the wire pulling amount detected by the sensor 103. Specifically, a model that maps the wire pulling amount to the bending angle θr is described in advance using a mathematical formula, a look-up table, or the like, and the wire pulling amount is converted to the bending angle θr using the model. The control device 100 may execute the processing of step S1. The physical quantity for estimating the bending angle θr is not limited to the wire pulling amount, but may be, for example, an operation knob rotation amount, a motor rotation amount, or a result of shape measurement by UPD.

In step S2, the processing section 210 estimates the shape of the bending portion from the bending angle θr. That is, the processing section 210 sets the bending angle of the 3D model to θm=θr, and reproduces on a 3D model the shape of the bending portion when it is bent at that bending angle θm. Specifically, the processing section 210 generates a 3D model at the bending angle θm by simulating the shape of the bending portion at the bending angle θm based on design information such as about joints of the bending portion and interconnections of the joints.

In step S3, the processing section 210 sets the viewpoint of the virtual camera 52 at a position that is in predetermined positional relationship to the distal end of the bending portion of the 3D model. Specifically, the processing section 210 sets the gaze point RC of the virtual camera 52 at the distal or proximal end of the bending portion, sets the angle of the viewing direction SDc to θc=θm, and places the virtual camera 52 in the object space based on these parameters.

In step S4, the processing section 210 generates a CG image of the endoscope 3D model as viewed from the virtual camera 52. In step S5, the processing section 210 displays the generated CG image on the display 20 together with the endoscope image.

In the above embodiment, the processing section 210 changes the rotation angle θc of the viewing direction SDc in synchronization with the bending angle θr. Synchronizing the rotation angle θc with the bending angle θr refers to aligning the rotation angle θc with changes in the bending angle θr in real time.

According to the present embodiment, the viewpoint of the virtual camera 52 rotates to cause the viewing direction SDc to point in the same direction as the bending angle θr, which can cause the imaging direction IDm in the CG image of the endoscope 3D model to be aligned with the imaging direction IDr in the endoscope image on the screen. This provides alignment between the operation direction of the bending operation and the moving direction of the distal end of the bending portion in the 3D model regardless of the bending angle, allowing the surgeon to intuitively recognize the operation direction.

3. Second Embodiment

Figure 8:
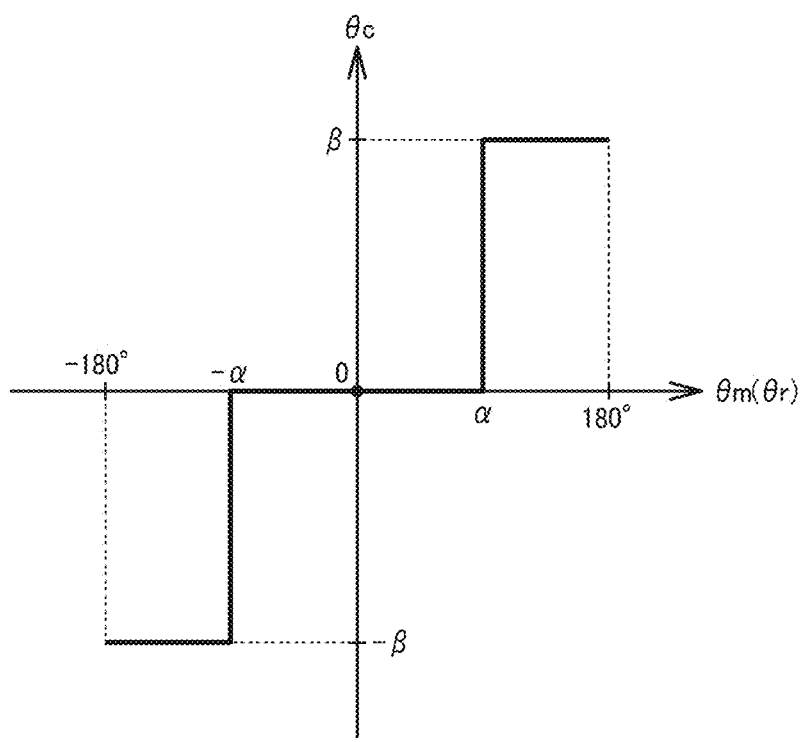
FIG. 8 illustrates relationship between a bending angle and a rotation angle of a viewing direction according to a second embodiment.

FIG. 8 illustrates relationship between the bending angle θm and the rotation angle θc of the viewing direction SDc according to the second embodiment. FIG. 9 illustrates example CG image displays according to the second embodiment.

As shown in FIG. 8, the processing section 210 sets θc=0 degrees in the range of |θm| ≤α degrees, sets θc=−β degrees in the range of −180≤θm<−α degrees, and sets θc=β degrees in the range of α<θm≤180 degrees, where 0<α<180 and 0<β<180. If 2α=β, the viewpoint switches when the imaging direction comes to the center between the viewing directions before and after rotation, making it easy to recognize the viewpoint switch. However, α and β need only to satisfy α≤β. FIG. 9 illustrates examples displays when α=90 degrees and β=180 degrees. With α=90 degrees, the CG image is reversed right-to-left when the imaging direction is at 90 degrees. The imaging direction varies between the direction going into the screen and the lateral direction, and never points out of screen relative to the lateral direction. As a result, the difference between the imaging direction in the endoscope image and the imaging direction in the CG image is less than or equal to 90 degrees, allowing for intuitive bending operations.

Figure 10:
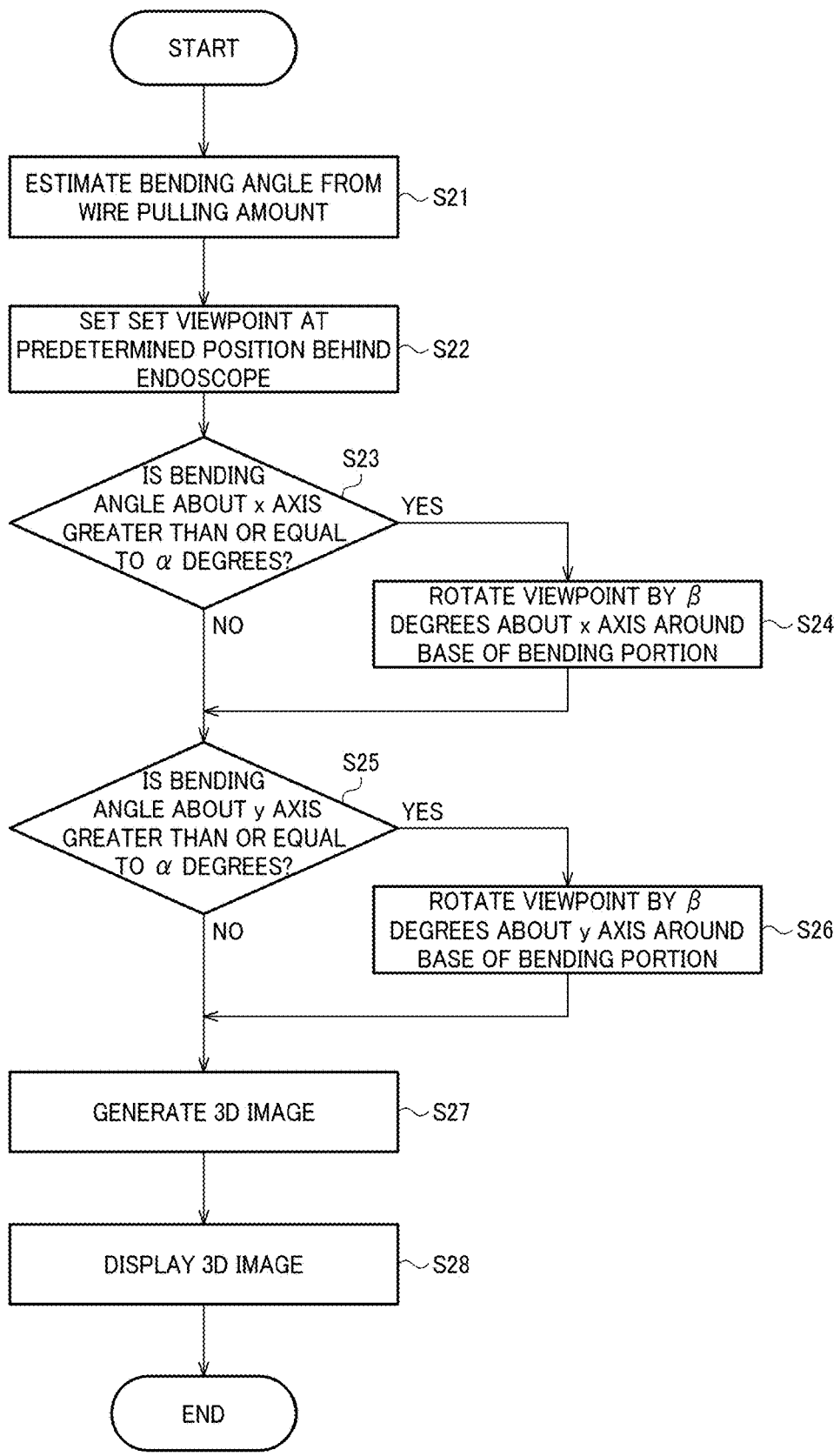
FIG. 10 is a process flowchart according to the second embodiment.

FIG. 10 is a process flowchart according to the second embodiment. In step S21, the processing section 210 estimates the bending angle θr of the endoscope 10 from the wire pulling amount detected by the sensor 103.

In step S22, the processing section 210 sets the viewpoint of the virtual camera 52 at a predetermined position behind the endoscope. Specifically, the processing section 210 sets the gaze point RC at the proximal of the bending portion and sets the angle of the viewing direction SDc to θc=0 degrees.

In step S23, the processing section 210 determines whether the bending angle about the x axis is |θx|≥α. If |θx|<α, then the process moves to step S25. If |θx|≥α, then in step S24, the processing section 210 rotates the viewpoint of the virtual camera 52 by β degrees about the x axis around the gaze point RC. Specifically, if θx≤−α, the processing section 210 rotates the viewpoint by −β degrees, and if θx≥+α, the processing section 210 rotates the viewpoint by +β degrees. The process then moves to step S25.

In step S25, the processing section 210 determines whether the bending angle about the y axis is |θy|≥α. If |θy|<α, then the process moves to step S27. If |θy|≥α, then in step S26, the processing section 210 rotates the viewpoint of the virtual camera 52 by β degrees about the y axis around the gaze point RC. Specifically, if θy≤−α, the processing section 210 rotates the viewpoint by −β degrees, and if θy≥+α, the processing section 210 rotates the viewpoint by +β degrees. The process then moves to step S27.

In step S27, the processing section 210 generates a CG image of the endoscope 3D model as viewed from the virtual camera 52. In step S28, the processing section 210 displays the generated CG image on the display 20 together with the endoscope image.

While the example of switching the viewpoint only once is provided above, the viewpoint may be switched more than once.

In the above embodiment, the processing section 210 fixes the rotation angle θc at the first angle until the bending angle θr exceeds the threshold α. In the example of the present embodiment, the first angle is 0 degrees, though this is not limiting. Upon the bending angle θr exceeding the threshold α, the processing section 210 switches the rotation angle θc to the second angle β greater than the first angle.

According to the present embodiment, the viewpoint is switched upon the bending angle θr exceeding a predetermined angle, which can make the imaging direction IDr in the endoscope image and the imaging direction IDm in the CG image of the endoscope 3D model closer to each other than when the viewpoint is not switched. As the viewpoint is not rotated very often, easier viewing of the bending shape from the CG image can be expected.

4. Third Embodiment

Figure 11:
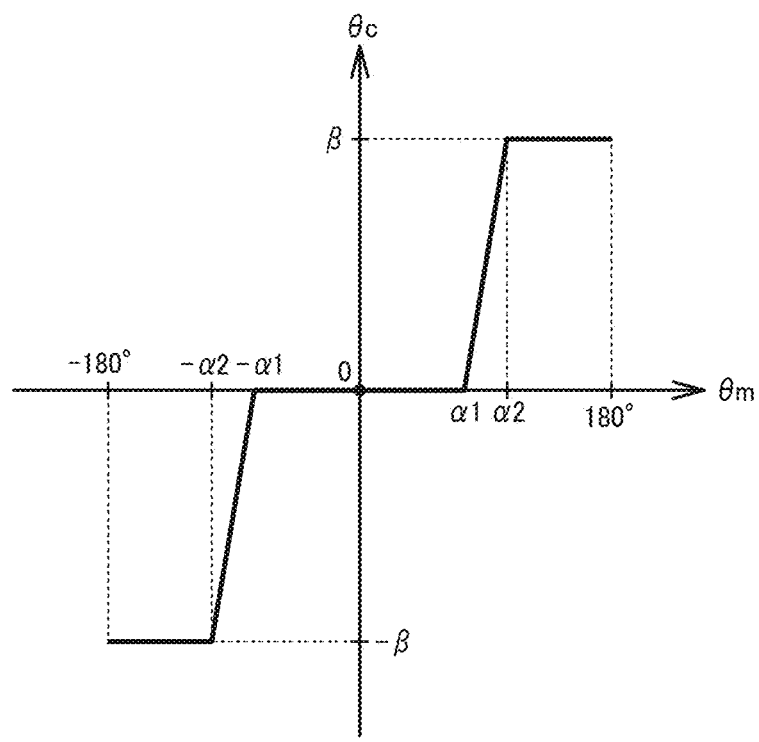
FIG. 11 illustrates relationship between a bending angle and a rotation angle of a viewing direction according to a third embodiment.
Figure 12:
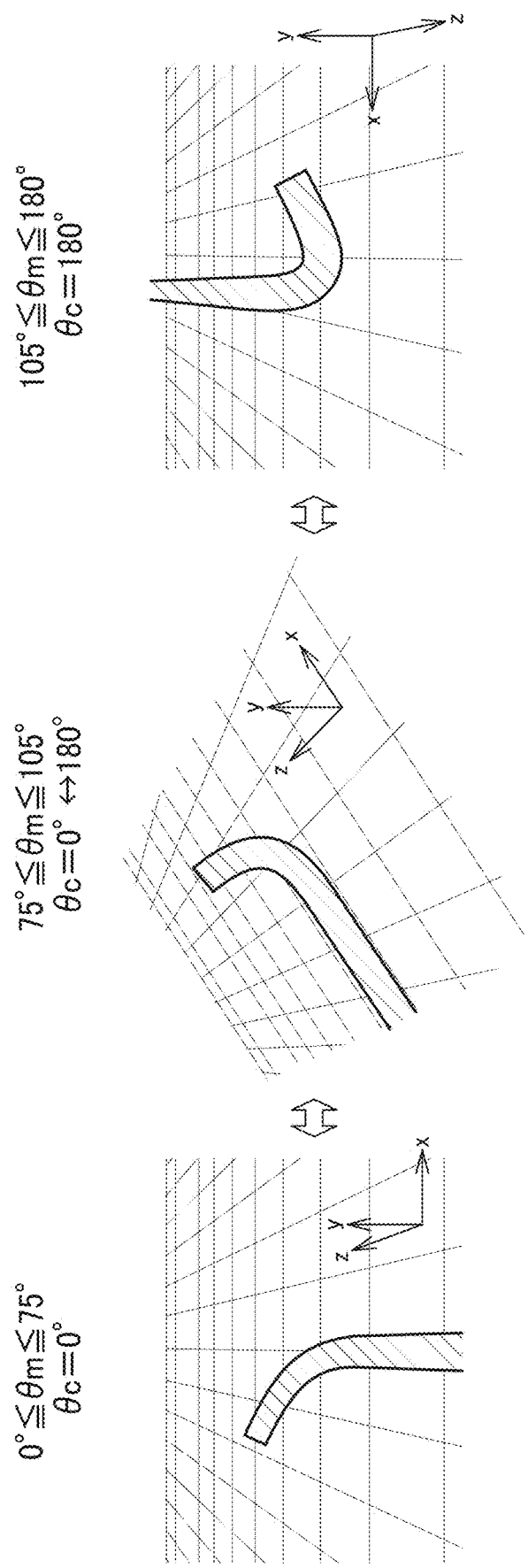
FIG. 12 illustrates example CG image displays according to the third embodiment.

FIG. 11 illustrates relationship between the bending angle θm and the rotation angle θc of the viewing direction SDc according to the third embodiment. FIG. 12 illustrates example CG image displays according to the third embodiment.

As shown in FIG. 11, the processing section 210 sets θc=0 degrees in the range of |θm|≤α1 degrees, varies θc from 0 to 180 degrees in the range of α1 degrees<|θm|≤α2 degrees, and sets θc=0 degrees in the range of α2 degrees<|θm|≤180 degrees, where 0<α1<α2<180, and 0<β<180. FIG. 12 illustrates example displays when α1=75 degrees, α2=105 degrees, and β=180 degrees. When the bending angle θm changes from 75 degrees to 105 degrees, the viewing direction of the virtual camera rotates from θc=0 degrees to θc=180 degrees. As a result, the difference between the imaging direction in the endoscope image and the imaging direction in the CG image is less than or equal to 75 degrees, allowing for intuitive bending operations. In addition, this embodiment provides an effect that allows the surgeon to know that the viewpoint of the virtual camera has been intentionally changed as well as the meaning of the viewpoint switching, helping the surgeon understand the bending state and the direction of the bending operation upon viewing the CG image.

Figure 13:
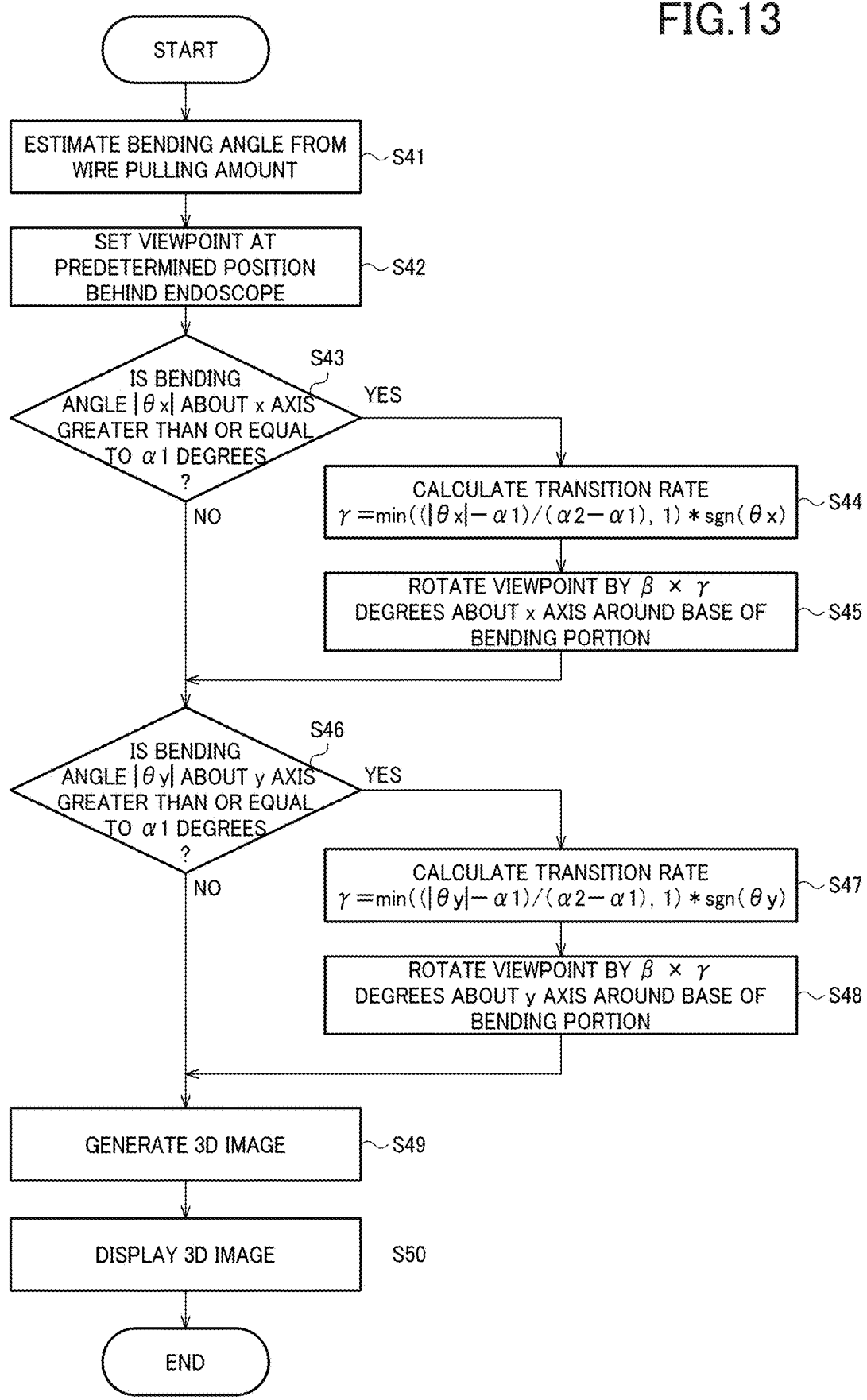
FIG. 13 is a process flowchart according to the third embodiment.

FIG. 13 is a process flowchart according to the third embodiment. In step S41, the processing section 210 estimates the bending angle θr of the endoscope 10 from the wire pulling amount detected by the sensor 103.

In step S42, the processing section 210 sets the viewpoint of the virtual camera 52 at a predetermined position behind the endoscope. Specifically, the processing section 210 sets the gaze point RC at the proximal end of the bending portion and sets the angle of the viewing direction SDc to θcx=θcy=0 degrees.

In step S43, the processing section 210 determines whether the bending angle about the x axis is |θx|≥α1. If |θx|<α1, then the process moves to step S46. If |θx|≥α1, then in step S44, the processing section 210 calculates a transition rate γ, where min((|θx|−α1)/(α2−α1), 1) is a function to select the smaller of (|θx|−α1)/(α2−α1) and 1, and sgn(θx) is a function to extract the sign of θx. If α1≤|θx|≤α2, then 0≤γ≤1, and if α2<|θx|, then γ=1. In step S45, the processing section 210 rotates the viewpoint of the virtual camera 52 by θcx=β×γ degrees about the x axis around the gaze point RC. The process then moves to step S46.

In step S46, the processing section 210 determines whether the bending angle about the y axis is |θy|≥α1. If |θy|<α1, then the process moves to step S49. If |θy|≥α1, then in step S47, the processing section 210 calculates the transition rate γ. In step S48, the processing section 210 rotates the viewpoint of the virtual camera 52 by θcy=β×γ degrees about the y axis around the gaze point RC. The process then moves to step S49.

In step S49, the processing section 210 generates a CG image of the endoscope 3D model as viewed from the virtual camera 52. In step S50, the processing section 210 displays the generated CG image on the display 20 together with the endoscope image.

In the above embodiment, the processing section 210 fixes the rotation angle θc at the first fixed angle when the bending angle θr is less than the first threshold α1. In the example of the present embodiment, the first fixed angle is 0 degrees, though this is not limiting. When the bending angle θr is between the first threshold α1 and the second threshold α2 greater than the first threshold α1, the processing section 210 varies the rotation angle θc from the first fixed angle to the second fixed angle β greater than the first fixed angle, according to the bending angle θr. When the bending angle θr is greater than the second threshold α2, the processing section 210 fixes the rotation angle θc at the second fixed angle β.

According to the present embodiment, the difference between the imaging direction in the endoscope image and the imaging direction in the CG image can be reduced as compared to when the viewpoint is not rotated, allowing for intuitive bending operations. In addition, this embodiment provides an effect that allows the surgeon to know that the viewpoint of the virtual camera has been intentionally changed as well as the meaning of the viewpoint switching, helping the surgeon understand the bending state and the direction of the bending operation upon viewing the CG image.

5. Fourth Embodiment

In the fourth embodiment, the viewpoint of the virtual camera 52 can be switched between a fixed mode, in which the viewpoint of the virtual camera 52 is fixed regardless of the bending angle, and a rotational mode, in which the viewpoint of the virtual camera 52 is rotated according to the bending angle.

The operation section 400 is configured to receive input operations to switch between the fixed mode and the rotation mode. In response to the modes being switched via the operation section 400, the processing section 210 sets the fixed mode or the rotation mode according to the input. In the fixed mode, the processing section 210 sets, e.g., θc=0 degrees, while in the rotation mode, the processing section 210 executes the viewpoint rotation in any of the first to third embodiments described above and the fifth and sixth embodiments described below.

In the above embodiment, the processing section 210 can switch between the rotation mode, in which the processing section 210 executes the rotation process of rotating the viewing direction SDc of the virtual camera 52, and the fixed mode, in which the processing section 210 fixes the rotation angle θc regardless of the shape of the manipulator.

According to the present embodiment, it is possible to switch between the rotation mode and the fixed mode depending on a surgeon. This technique can accommodate both surgeons who find it easier to recognize the state and direction of the bending operations with a fixed viewpoint and those who find it easier to recognize the state and direction of the bending operations with a rotating viewpoint.

6. Fifth Embodiment

In the fifth embodiment, the viewpoint of the virtual camera 52 is rotated about the x axis when the bending angle θx about the x axis is greater than the bending angle θy about the y axis, and the viewpoint of the virtual camera 52 is rotated about the y axis when the bending angle θy about the y axis is greater than the bending angle θx about the x axis. While the following description provides an example of combining the fifth embodiment with the second or third embodiment, the fifth embodiment may also be combined with the first embodiment.

Figure 14:
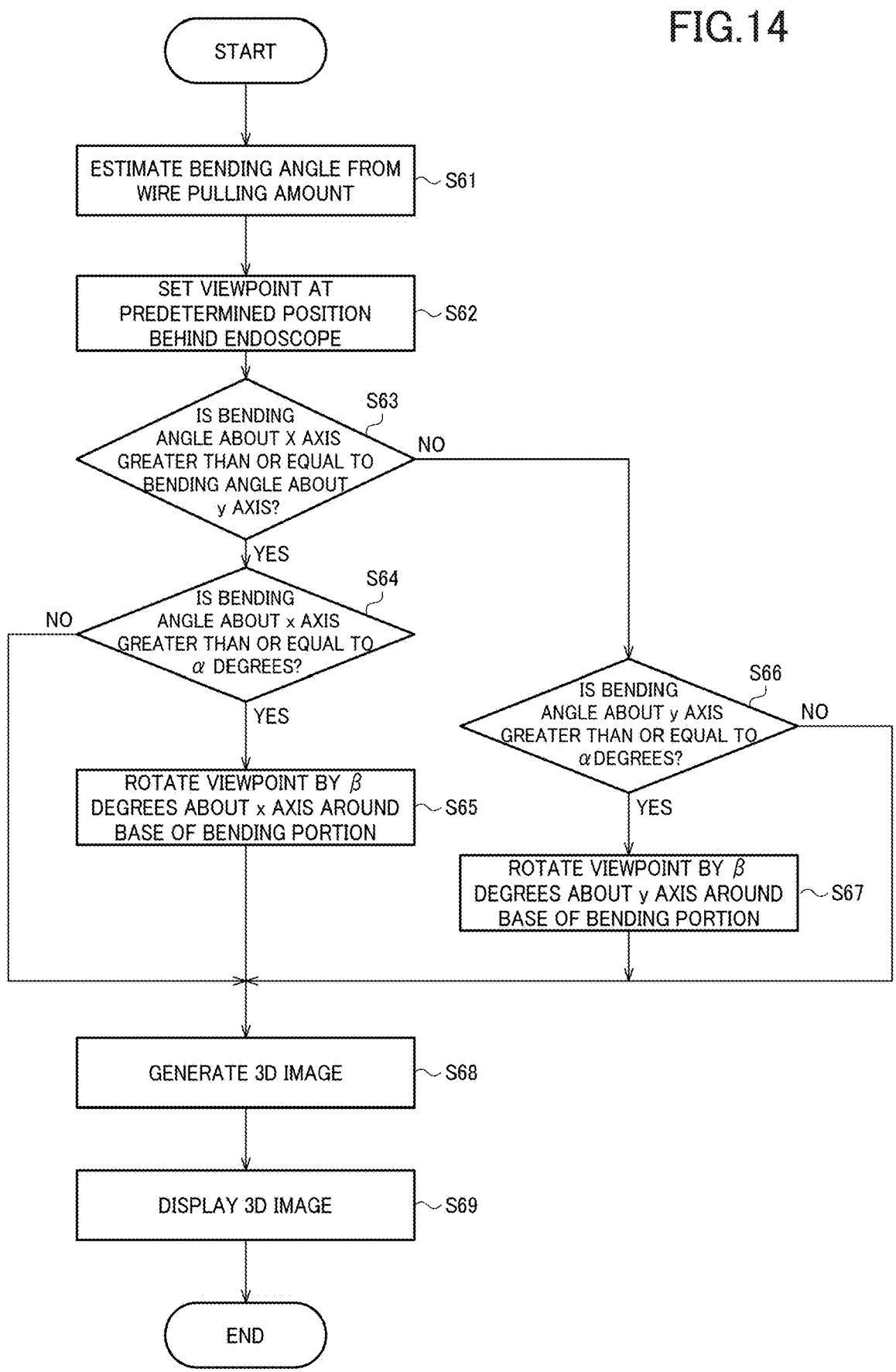
FIG. 14 is a flowchart according to a fifth embodiment in combination with the second embodiment.

FIG. 14 is a flowchart according to the fifth embodiment in combination with the second embodiment. In step S61, the processing section 210 estimates the bending angle θr of the endoscope 10 from the wire pulling amount detected by the sensor 103.

In step S62, the processing section 210 sets the viewpoint of the virtual camera 52 at a predetermined position behind the endoscope. Specifically, the processing section 210 sets the gaze point RC at the proximal end of the bending portion and sets the angle of the viewing direction SDc to θc=0 degrees.

In step S63, the processing section 210 determines whether the bending angle about the x axis is greater than or equal to the bending angle about the y axis, that is, whether |θx|≥|θy|. If |θx|≥|θy|, then in step S64, the processing section 210 determines whether the bending angle about the x axis is |θx|≥α. If |θx|<α, then the process moves to step S68. If |θx|≥α, then in step S65, the processing section 210 rotates the viewpoint of the virtual camera 52 by β degrees about the x axis around the gaze point RC. The process then moves to step S68.

If |θx|<|θy| in step S63, then the processing section 210 determines in step S66 whether the bending angle about the y axis is |θy|≥α. If |θy|<α, then the process moves to step S68. If |θy|≥α, then in step S67, the processing section 210 rotates the viewpoint of the virtual camera 52 by β degrees about the y axis around the gaze point RC. The process then moves to step S68.

In step S68, the processing section 210 generates a CG image of the endoscope 3D model as viewed from the virtual camera 52. In step S69, the processing section 210 displays the generated CG image on the display 20 together with the endoscope image.

Figure 15:
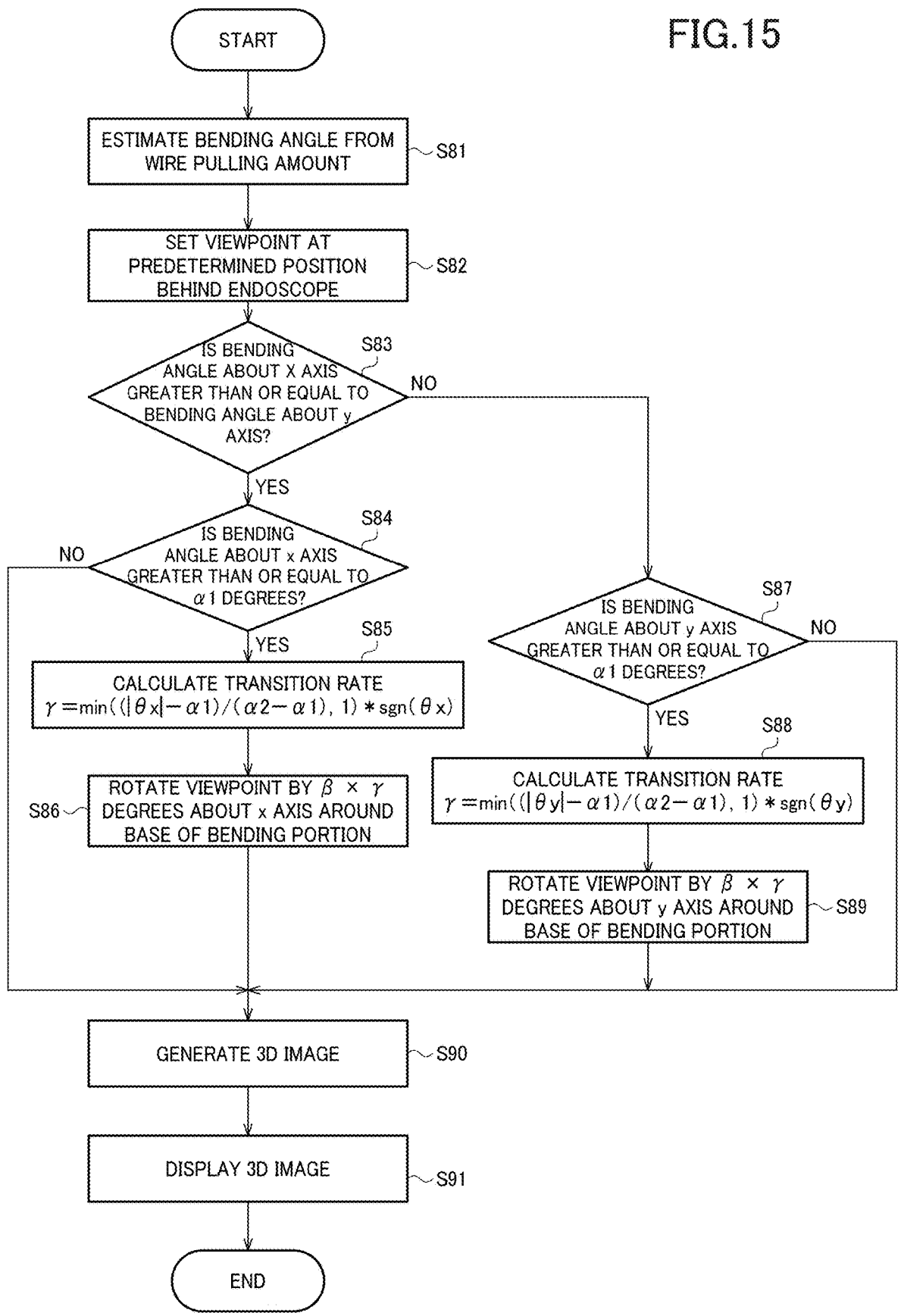
FIG. 15 is a flowchart according to the fifth embodiment in combination with the third embodiment.

FIG. 15 is a flowchart according to the fifth embodiment in combination with the third embodiment. In step S81, the processing section 210 estimates the bending angle θr of the endoscope 10 from the wire pulling amount detected by the sensor 103.

In step S82, the processing section 210 sets the viewpoint of the virtual camera 52 at a predetermined position behind the endoscope. Specifically, the processing section 210 sets the gaze point RC at the proximal end of the bending portion and sets the angle of the viewing direction SDc to θcx=θcy=0 degrees.

In step S83, the processing section 210 determines whether the bending angle about the x axis is greater than or equal to the bending angle about the y axis, that is, whether |θx|≥|θy|. If |θx|≥|θy|, then in step S84, the processing section 210 determines whether the bending angle about the x axis is |θx|≥α1. If |θx|<α1, then the process moves to step S90. If |θx|≥α1, then in step S85, the processing section 210 calculates the transition rate γ. In step S86, the processing section 210 rotates the viewpoint of the virtual camera 52 by θcx=β×γ degrees about the x axis around the gaze point RC. The process then moves to step S90.

If |θx|<|θy| in step S83, then the processing section 210 determines in step S87 whether the bending angle about the y axis is |θy|≥α1. If |θy|<α1, then the process moves to step S90. If |θy|≥α1, then in step S88, the processing section 210 calculates the transition rate γ. In step S89, the processing section 210 rotates the viewpoint of the virtual camera 52 by θcy=β×γ degrees about the x axis around the gaze point RC. The process then moves to step S90.

In step S90, the processing section 210 generates a CG image of the endoscope 3D model as viewed from the virtual camera 52. In step S91, the processing section 210 displays the generated CG image on the display 20 together with the endoscope image.

In the above embodiment, the acquisition section 220 acquires information about the first bending angle θx about the first axis and the second bending angle θy about the second axis intersecting the first axis. In the example of the present embodiment, the x axis corresponds to the first axis, and the y axis corresponds to the second axis. The processing section 210 executes the rotation process at a rotation angle θc according to the greater of the first bending angle θx and the second bending angle θy.

According to the present embodiment, the viewpoint of the virtual camera 52 rotates only about the x axis or about the y axis, so that the viewpoint rotation in the CG image is simplified as compared to when the viewpoint rotates about both axes. This is expected to provide easier viewing of the bending shape from the CG image.

7. Sixth Embodiment

Figure 16:
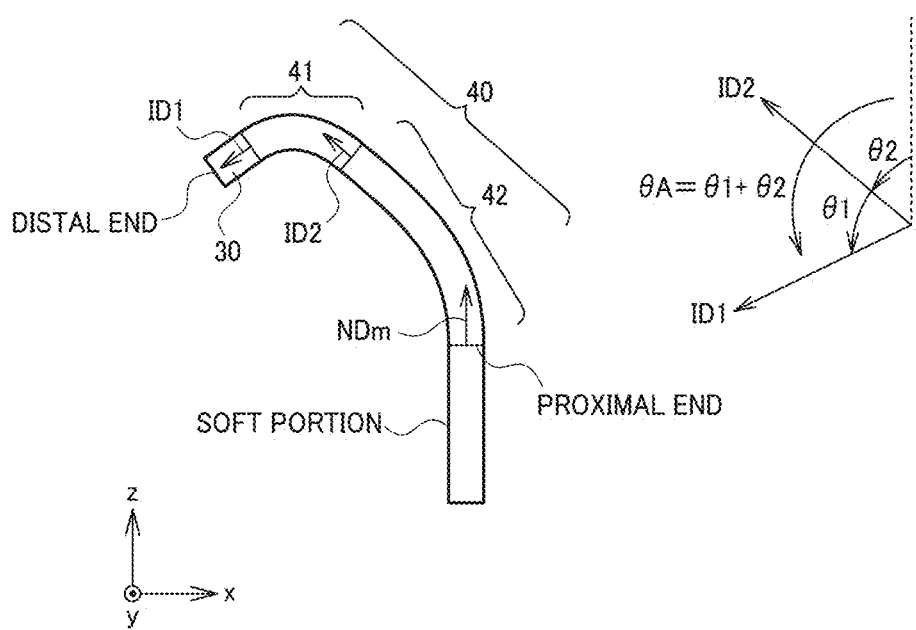
FIG. 16 illustrates an example configuration of a bending portion according to a sixth embodiment.

FIG. 16 illustrates an example configuration of the bending portion according to a sixth embodiment. The bending portion 40 includes a first bending portion 41 and a second bending portion 42. The first bending portion 41 is also referred to as a distal bending portion, and the second bending portion 42 is also referred to as a proximal bending portion.

The proximal end of the second bending portion 42 is the proximal end of the bending portion 40, which is connected to the distal end of the soft portion. The proximal end of the first bending portion 41 is connected to the distal end of the second bending portion 42, and the rigid portion and the imaging section 30 are provided at the distal end of the first bending portion 41. A motorized endoscope is envisioned in the fifth embodiment, and the first bending portion 41 and the second bending portion 42 are controlled depending on modes described below in FIG. 17. Depending on the modes, the first bending portion 41 and the second bending portion 42 may be controlled independently of or in concert with each other.

As shown in FIG. 16, the axial direction of the distal end of the soft portion is defined as NDm, the axial direction of the distal end of the second bending portion 42 as ID2, and the axial direction of the distal end of the first bending portion 41 as ID1. The angle between ID1 and ID2 is a bending angle θ1 of the first bending portion 41, and the angle between ID2 and NDm is a bending angle θ2 of the second bending portion 42. The bending angle of the overall bending portion 40 is θA=θ1+θ2, which is hereinafter referred to as an overall bending angle.

Figure 17:
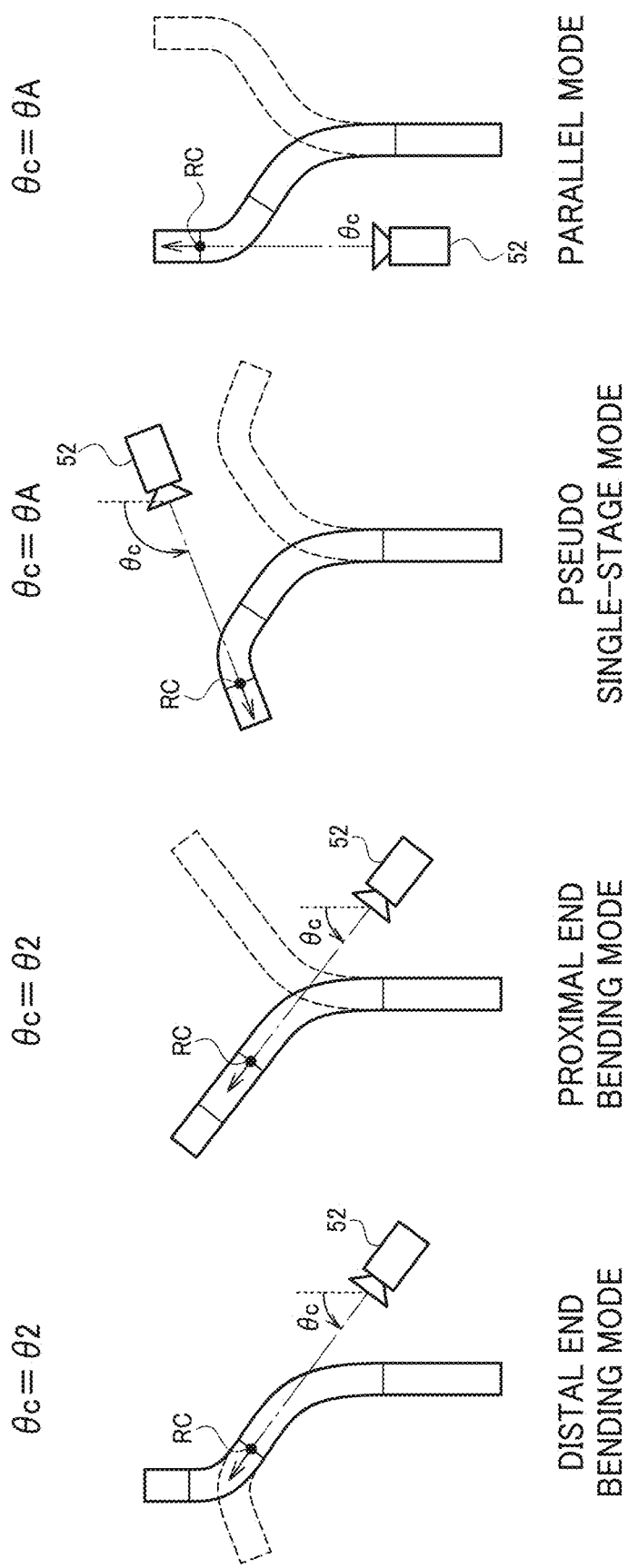
FIG. 17 illustrates example control modes for two-stage bending.

FIG. 17 illustrates example control modes for two-stage bending. The control device 100 has the following control modes for two-stage bending; a distal end bending mode, a proximal end bending mode, a pseudo single-stage mode, and a parallel mode. The operation section 400 is configured to receive mode switching operations and bending portions in each mode. The control device 100 includes a first motor for bending the first bending portion 41 and a second motor for bending the second bending portion 42, and controls the first motor and the second motor according to operation input from the operation section 400 to bend the first bending portion 41 and the second bending portion 42. The processing section 210 switches the viewpoint control of the virtual camera 52 according to the mode set by the operation section 400.

In distal end bending mode, the bending angle θ2 of the second bending portion 42 is fixed, and the bending angle θ1 of the first bending portion 41 is variably controlled according to the operation input.

In proximal end bending mode, the bending angle θ1 of the first bending portion 41 is fixed, and the bending angle θ2 of the second bending portion 42 is variably controlled according to the operation input.

In the distal end bending mode and the proximal end bending portion mode, the processing section 210 sets the gaze point RC at the distal end of the second bending portion 42 and sets the viewing direction of the virtual camera 52 at an angle θc=θ2. The gaze point RC need only be within the second bending portion 42; for example, the gaze point RC may be near the distal end of the second bending portion 42. The viewpoint of the virtual camera 52 is not limited to θc=θ2, and the methods described in the second to fifth embodiments may be combined.

Since the range of motion of the second bending portion 42 is larger than that of the first bending portion 41, the bending is roughly defined in the proximal end bending mode, and the roughly defined position is then used as a reference to adjust the bending in the distal end bending mode for treatment or other purposes. Therefore, the viewpoint is set according to the bending of the second bending portion 42 serving as the reference, that is, the viewing direction of the virtual camera 52 is set at the angle θc=θ2, which helps the surgeon intuitively recognize the bending operation.

In the pseudo single-stage mode, the first bending portion 41 and the second bending portion 42 are controlled in concert with each other such that they behave as one bending portion. For example, in response to a left bending operation, both θ1 and θ2 are controlled in the + direction, and in response to a right bending operation, both θ1 and θ2 are controlled in the − direction. This causes the bending portion as a whole to bend at the bending angle θA=θ1+θ2.

In the parallel mode, the first bending portion 41 and the second bending portion 42 are controlled such that the imaging direction moves in parallel. For example, in response to an operation to the left, θ2 is controlled in the + direction while θ1 is controlled in the − direction. The angles are controlled to be θ1=−θ2, so that the imaging section moves leftward in parallel while the imaging direction is held constant.

In the pseudo single-stage mode and the parallel mode, the processing section 210 sets the gaze point RC at the distal end of the first bending portion 41 and sets the viewing direction of the virtual camera 52 at the angle θc=θA. The gaze point RC need only be within the first bending portion 41; for example, the gaze point RC may be near the distal end of the first bending portion 41. The viewpoint of the virtual camera 52 is not limited to θc=θA, and the methods described in the second to fifth embodiments may be combined.

In the above embodiment, the bending portion 40 includes the first bending portion 41 and the second bending portion 42 that is proximal relative to the first bending portion 41. The processing section 210 executes a rotation process at a rotation angle θc according to the second bending portion bending angle θ2, which is the bending angle of the second bending portion 42, or the overall bending angle θA, which is the bending angle of the bending portion 40 as a whole.

According to the present embodiment, in the two-stage bending by the first bending portion 41 and the second bending portion 42, the viewpoint of the virtual camera 52 can follow the imaging direction according to the bending state. This allows for an intuitive recognition of the direction of the bending operation in the two-stage bending as well.

In the present embodiment, the processing section 210 also executes a rotation process at a rotation angle θc according to the second bending portion bending angle θ2. Specifically, such a rotation process is executed in the distal end bending mode and the proximal end bending mode, in which the first bending portion 41 and the second bending portion 42 are individually controlled.

Rotating the viewpoint according to the bending angle θ2 of the second bending portion 42, which roughly defines the bending to be used as the reference, helps the surgeon intuitively recognize the bending operation.

In the present embodiment, the processing section 210 also executes a rotation process at a rotation angle θc according to the overall bending angle θA when the bending direction of the first bending portion 41 is controlled in the same or opposite direction as the bending direction of the second bending portion 42. Specifically, such a rotation process is executed in the pseudo single-stage mode and the parallel mode, in which the first bending portion 41 and the second bending portion 42 are controlled in concert with each other.

When the first bending portion 41 and the second bending portion 42 are controlled in concert with each other, the bending state will be more easily recognized from the CG image by controlling the viewpoint according to the direction in which the distal end of the bending portion 40 points.

In the present embodiment, in the first bending mode, in which the bending of the second bending portion 42 is controlled, the processing section 210 executes a rotation process at a rotation angle θc according to the second bending portion bending angle θ2. In the second bending mode, in which the bending direction of the first bending portion 41 is controlled in the same direction as the bending direction of the second bending portion 42, or in a third bending mode, in which the bending direction of the first bending portion 41 is controlled in a direction opposite the bending direction of the second bending portion 42, the processing section 210 executes a rotation process at a rotation angle θc according to the overall bending angle θA. In the present embodiment, the proximal end bending mode corresponds to the first bending mode, the pseudo single-stage mode corresponds to the second bending mode, and the parallel mode corresponds to the third bending mode.

Depending on any of various bending control modes for the two-stage bending, the present embodiment allows for a viewpoint rotation that is appropriate for that bending control mode. Thus, in each bending control mode, a CG display of an appropriate 3D model can be presented to the surgeon.

Although the embodiments to which the present disclosure is applied and the modifications thereof have been described in detail above, the present disclosure is not limited to the embodiments and the modifications thereof, and various modifications and variations in components may be made in implementation without departing from the spirit and scope of the present disclosure. The plurality of elements disclosed in the embodiments and the modifications described above may be combined as appropriate to implement the present disclosure in various ways. For example, some of all the elements described in the embodiments and the modifications may be deleted. Furthermore, elements in different embodiments and modifications may be combined as appropriate. Thus, various modifications and applications can be made without departing from the spirit and scope of the present disclosure. Any term cited with a different term having a broader meaning or the same meaning at least once in the specification and the drawings can be replaced by the different term in any place in the specification and the drawings.

The invention claimed is:

1. An image processing device comprising a processor comprising hardware, the processor being configured to:
   acquire shape information about a shape of a bending portion of a manipulator, the bending portion of the manipulator configured to vary its shape, and an imaging section comprising an image sensor positioned at a tip of the bending portion; and
   display on a display a computer graphics image of a manipulator model for at least the bending portion as viewed from a virtual camera in an object space, based on the shape information, wherein
   the processor is configured to execute a rotation process of rotating a viewing direction of the virtual camera by a rotation angle according to the shape information.

2. The image processing device according to claim 1, wherein
   the bending portion being positioned at the distal side of the manipulator,
   the processor acquires information about a bending angle of the bending portion as the shape information, and executes the rotation process of rotating the viewing direction of the virtual camera by the rotation angle according to the bending angle.

3. The image processing device according to claim 2, wherein the processor changes the rotation angle in synchronization with the bending angle.

4. The image processing device according to claim 2, wherein
   the processor fixes the rotation angle at a first angle until the bending angle exceeds a threshold, and
   in response to the bending angle exceeding the threshold, the processor switches the rotation angle to a second angle greater than the first angle.

5. The image processing device according to claim 2, wherein
   when the bending angle is less than a first threshold, the processor fixes the rotation angle at a first fixed angle,
   when the bending angle is between the first threshold and a second threshold greater than the first threshold, inclusive, the processor varies the rotation angle from the first fixed angle to a second fixed angle greater than the first fixed angle, according to the bending angle, and
   when the bending angle is greater than the second threshold, the processor fixes the rotation angle at the second fixed angle.

6. The image processing device according to claim 2, wherein the processor acquires information about a first bending angle about a first axis and a second bending angle about a second axis intersecting the first axis, and executes the rotation process at the rotation angle according to the greater of the first bending angle and the second bending angle.

7. The image processing device according to claim 2, wherein
   the bending portion includes a first bending portion and a second bending portion proximal relative to the first bending portion, and
   the processor executes the rotation process at the rotation angle according to a second bending portion bending angle, which is a bending angle of the second bending portion, or an overall bending angle, which is a bending angle of the bending portion as a whole.

8. The image processing device according to claim 7, wherein the processor executes the rotation process at the rotation angle according to the second bending portion bending angle.

9. The image processing device according to claim 7, wherein the processor executes the rotation process at the rotation angle according to the overall bending angle when a bending direction of the first bending portion is controlled in a same or opposite direction as a bending direction of the second bending portion.

10. The image processing device according to claim 7, wherein
    in a first bending mode, in which bending of the second bending portion is controlled, the processor executes the rotation process at the bending angle according to the second bending portion bending angle, and
    in a second bending mode, in which a bending direction of the first bending portion is controlled in a same direction as a bending direction of the second bending portion, or in a third bending mode, in which the bending direction of the first bending portion is controlled in a direction opposite the bending direction of the second bending portion, the processor executes the rotation process at the rotation angle according to the overall bending angle.

11. The image processing device according to claim 1, wherein the processor is capable of switching between a rotation mode, in which the processor executes the rotation process, and a fixed mode, in which the processor fixes the rotation angle regardless of the shape.

12. The image processing device according to claim 1, wherein the rotation process comprises a process of rotating the viewing direction of the virtual camera around a set point on the manipulator model.

13. A manipulator system with a bending portion and an imaging section comprising an image sensor provided at a distal end of the bending portion, comprising:
    a processor comprising hardware; and
    a display, wherein
    the processor is configured to display on the display a computer graphics image of a manipulator model for at least the bending portion in a viewing direction of a virtual camera that follows an imaging direction of the imaging section.

14. The manipulator system according to claim 13, wherein
    the processor changes the viewing direction of the virtual camera according to a bending angle of the bending portion.

15. The manipulator system according to claim 14, wherein
    the bending portion is positioned at the distal side of the manipulator, and
    the processor changes the viewing direction in synchronization with the bending angle.

16. The manipulator system according to claim 14, wherein
    the bending portion includes a first bending portion and a second bending portion proximal relative to the first bending portion, and
    the processor changes the viewing direction of the virtual camera according to a second bending portion bending angle, which is a bending angle of the second bending portion, or an overall bending angle, which is a bending angle of the bending portion as a whole.

17. An image processing method comprising:

acquiring shape information about a shape of a bending portion of a manipulator, the bending portion of the manipulator configured to vary its shape, and an imaging section comprising an image sensor positioned at a tip of the bending portion;

executing a rotation process of rotating a viewing direction of a virtual camera in an object space by a rotation angle according to the shape information, based on the shape information; and displaying on a display a computer graphics image of a manipulator model for at least the bending portion as viewed from the virtual camera in the object space.

18. The image processing method according to claim 17, further comprising:

acquiring information about a bending angle of the bending portion of the manipulator as the shape information; and executing the rotation process of rotating the viewing direction of the virtual camera by the rotation angle according to the bending angle.

19. A display method for displaying a computer graphics image of a manipulator model, comprising:

displaying on a display the computer graphics image of the manipulator model for at least a bending portion of a manipulator in a viewing direction of a virtual camera that follows an imaging direction of an imaging section comprising an image sensor provided at a distal end of the bending portion.

20. The display method according to claim 19, further comprising:

changing the viewing direction of the virtual camera according to a bending angle of the bending portion.

* * * * *